June 30, 1959 S. KUCHINSKY 2,892,959

ELECTRONIC DEVICE AND CIRCUITS

Filed Aug. 19, 1954 4 Sheets-Sheet 1

INVENTOR
SAUL KUCHINSKY
BY
Laurence R. Brown
ATTORNEY

ELECTRONIC DEVICE AND CIRCUITS

Filed Aug. 19, 1954 4 Sheets-Sheet 2

INVENTOR
SAUL KUCHINSKY
BY
Laurence R. Brown
ATTORNEY

June 30, 1959 S. KUCHINSKY 2,892,959

ELECTRONIC DEVICE AND CIRCUITS

Filed Aug. 19, 1954 4 Sheets-Sheet 3

INVENTOR
SAUL KUCHINSKY
BY
Lawrence R. Brown
ATTORNEY

INVENTOR
SAUL KUCHINSKY
BY
Lawrence R. Brown
ATTORNEY 2,892,959

ELECTRONIC DEVICE AND CIRCUITS

Saul Kuchinsky, Phoenixville, Pa., assignor to Burroughs Corporation, Detroit, Mich., a corporation of Michigan Application August 19, 1954, Serial No. 450,947

25 Claims. (Cl. 315—8.6)

This invention relates generally to information shift registers and more specifically to information shift registers utilizing electron beam switching tubes of the general type disclosed in application for United States Letters Patent, Serial No. 407,296, filed by Sin-pih Fan and Rudolph A. Cola on February 1, 1954, now U.S. Patent No. 2,848,646.

The storage of information is becoming increasingly important in computing apparatus of various types. Moreover it is desirable in many cases to shift stored information along a series of stages since it is often advantageous to feed information into and extract information from a storage register in a serial manner. There are in the prior art several types of shift registers including electronic, magnetic, and electro-mechanical. Of these the electronic type is highly desirable from the point of view of high speed of operation. However, the electronic type shift registers of the prior art require a large number of tubes and are relatively complex and expensive. Further, due to the complexity of prior art electronic shift registers the possibility of failure of operation is greater than it would be if a simpler construction were used. It would mark a definite improvement in the art to provide a high speed, reliable, and relatively inexpensive electronic information shift register.

It is an object of this invention to provide an electronic shift register having relatively few components per stage.

Another object of the invention is to provide an electronic shift register having a very high speed of operation and containing relatively few components per stage.

A further aim of the invention is to provide an inexpensive high speed electronic shift register.

A fourth object of the invention is to provide a compact high speed electronic shift register.

A fifth object of the invention is to provide a reversible electronic shift register.

Another object of the invention is to provide a reversible electronic shift register having relatively few components.

A further purpose of the invention is the improvement of electronic shift registers generally.

In accordance with one embodiment of the invention a plurality of electron beam position tubes and a plurality of gating networks are arranged alternately in a row. Each of the beam position tubes has a cathode adapted to generate an electron beam, a plurality of target electrodes, and a plurality of beam positioning control electrodes each individually associated with one of said target electrodes.

Each pair of electrodes consisting of a target electrode and the associated beam position control electrode in a given one of the aforementioned beam position tubes represents a different anode means or target for the electron beam. Each of these anode or target means may represent a particular digit. The electron beam in each of the tubes impinges simultaneously upon both a target electrode and the associated beam position control electrode, the latter being utilized first to direct and then to hold the electron beam in position. Gating networks are provided which when opened individually associate each of the target electrodes of a given beam position tube to corresponding beam position control electrodes of another similar beam position tube.

Switching means are provided to cause information stored in any one of a series of such beam position tubes to be transferred to the next succeeding tube. The switching means comprises structure to transmit a series of transfer pulses, each pulse simultaneously cutting off the electron beam of a given beam position tube and opening the immediately preceding gating network. Opening of the gating network permits an electrical signal from the anode means of a given beam position tube representative of the information stored in said given tube to be impressed upon the corresponding beam position electrode of the next succeeding beam position tube. Means, such as capacitance in the circuit, will maintain this signal for a short interval of time after the transfer pulse is terminated so that the electron beam of the said next succeeding tube, which is turned on at the termination of the transfer pulse, will be caused to impinge upon the said corresponding control electrode and the associated target electrode. The pulses are applied to said row in reverse order to the direction in which information is transferred.

In accordance with another embodiment of the invention, which permits shifting of information in both directions, a second plurality of gating networks is provided which individually associate each of the target electrodes of each of the beam position tubes with corresponding beam position control electrodes of the immediately preceding beam position tube in said row. A second switching means is also provided to transmit a series of transfer pulses, each transfer pulse simultaneously cutting off the electron beam of a given beam position tube and opening the gating network immediately following the given beam position tube. These transfer pulses are applied to the row of beam position tubes in an order opposite the direction in which information is to be transferred.

In accordance with one feature of the invention both the switching means and the beam position tubes may comprise a beam position tube of the type described in the U.S. Patent No. 2,848,646, mentioned hereinbefore. Other type switching means may be employed, if desired. For example, the beam position tube disclosed in United States patent application Serial No. 370,086, filed July 24, 1953, now U.S. Patent No. 2,721,955 by Saul Kuchinsky and Sin-pih Fan may be utilized both as a storage tube and a switching tube. This tube has a plurality of control grid electrodes individually associated with each pair of a target electrode and a beam position control electrode and adapted to cause the electron beam of the tube to step from target electrode to target electrode. Another type of beam position tube incorporates a grid electrode adapted to disable the electron beam of the tube from impinging upon any of the anode means. As will be seen later, this grid electrode can also be used to step the electron beam along consecutively from target electrode to target electrode.

When used as a switching means the target electrodes of the tubes are utilized as output electrodes and are connected to the beam position tubes in said row and are also connected to the gating networks. Depending on which direction it is desired to transfer information in the row of tubes consecutive target electrodes of the switching means are connected to the beam position tubes and the gating networks beginning at the beginning of the row and going to the end of the row or beginning at the end of the row and progressing to the beginning of the row.

In accordance with another feature of the invention zeroizing means are provided for each of said beam position tubes in said row of tubes and are individually adapted to cause the electron beam of the associated beam position tube to impinge upon a particular anode means defined as the "0" position by applying a pulse to cut off the electron beam and by applying another pulse to the particular anode means to create the proper electric field to cause the electron beam to impinge thereon when the electron beam is returned to an "on" condition.

Another feature of the invention comprises a plurality of pulse sources each individually associated with individual ones of said beam position tubes in said row of tubes. Each of pulse sources is adapted to apply pulses to the associated beam position tube to cause it to step consecutively from target electrode to target electrode independently of all the other beam position tubes in said row.

These and other objects, advantages and meritorious features of the invention will be more fully understood from the following detailed description of the invention when read in conjunction with the drawings in which.

Figure 1:
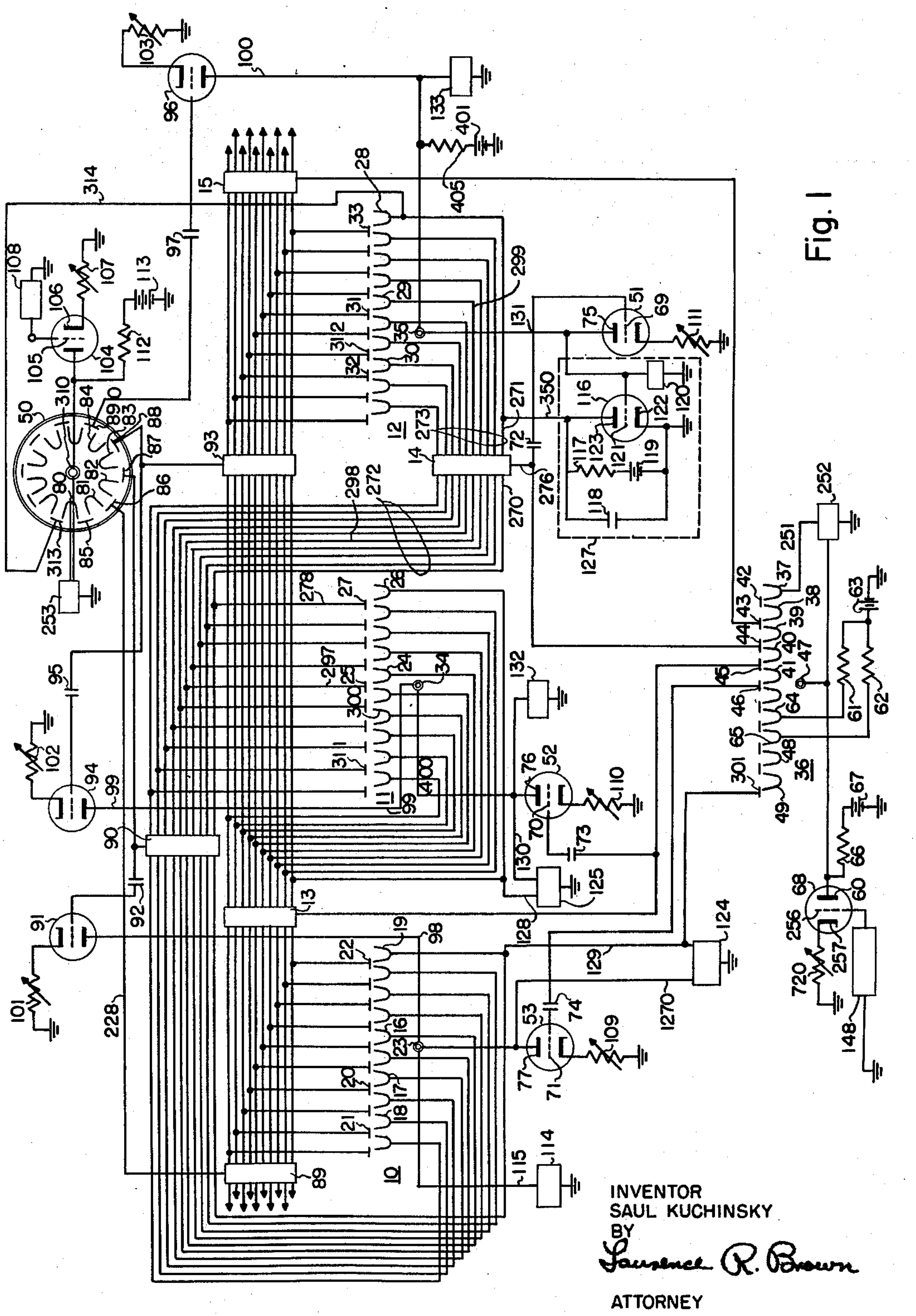
Fig. 1 is a schematic sketch of a circuit of a preferred embodiment of the invention.

Referring now to Fig. 1, tubes generally indicated at 10, 11, and 12 are arranged alternately with the gating networks 13, 14, and 15, and also with the gating networks 93, 90, and 89. It is to be noted that the target electrodes and spade electrodes of the tubes 10, 11, and 12 are shown as being arranged in a straight line. This is done only for the purpose of simplifying the drawing. Actually the spade electrodes and target electrodes of tubes 10, 11, 12, and also tube 36 are arranged concentrically around the cathode as shown in the representation of tube 50 at the top of Fig. 1. Each of the tubes 10, 11, and 12 has a plurality of similar spade electrodes such as spade electrodes 16, 24, and 30 respectively, a plurality of target electrodes such as target electrodes 22, 27, and 33 respectively, and a cathode 23, 34, or 35 respectively. The cathodes 23, 34, and 35 are each connected to a positive battery source. For example, cathode 35 of tube 12 is connected to the battery 401 through resistance 405. Cathodes 23 and 34 of tubes 10 and 11 have similar battery sources and resistances which are not shown in order to avoid making the drawing unnecessarily complex. It is further to be noted that all the spade electrodes and all the target electrodes of tubes 10, 11, and 12 are not identified by reference characters, nor are supplied voltages separately shown connected to the various spade and target electrodes of the beam tube in order to avoid unnecessarily complicating the drawing. However, each of the tubes 10, 11, and 12 has, in the preferred embodiment of the invention shown herein, ten spade electrodes and ten target electrodes. A switching or commutator tube 36 which may be of the same type as tubes 10, 11, and 12 also has ten spade electrodes and ten target electrodes. The spade electrodes are typified by such spade electrodes as 37, 38, 39,

40, 41, 48, and 49 and the target electrodes are typified by such target electrodes as 42, 43, 44, 45, and 46. A switching or commutator tube 50 also has ten target electrodes such as target electrode 313, ten spade electrodes such as spade electrode 84 and a cathode 310.

The ten target electrodes of each of the tubes such as tubes 10, 11, and 12 are connected through the gating networks 13, 14, and 15 to the corresponding spade electrodes of the next succeeding tubes respectively. As a specific example the sixth target electrode 25 of tube 11 is connected by line 298 to the sixth spade electrode 29 of tube 12 through the gating network 14. When tube 12 is cleared by virtue of its electron beam being cut off and the gating network 14 is opened by switching means to be described later the potential of target electrode 25 of tube 11 will be impressed upon the spade electrode 29 of tube 12 to cause the electron beam of tube 12, when it resumes its "on" condition, to lock upon the spade electrode 29 thereof.

The ten spade electrodes and the ten corresponding target electrodes of each of the tubes 10, 11, and 12 represent the digits 0 through 9 in consecutive order. Since the electron beam in each of the tubes 10, 11, and 12 sweep their respective target electrodes in a counterclockwise direction the targets are counted from right to left in Fig. 1. Each of the target electrodes of a particular tube, such as tube 11, representing particular digits is connected through the gating network to the spade electrode representing the same digit of the next adjacent tube, such as tube 12. Thus, the target electrode 25 of tube 11 which has been designated to represent the digit "4" is connected to the spade electrode 29 of tube 12 which has also been designated as representing the digit "4." By designating a particular spade electrode 29 as representing the digit "4" it is meant that the electron beam must be stepped along four spade electrodes from the "0" position spade electrode which in the case of tube 12 is spade electrode 28.

Switching tube 36 is provided to cause information stored in tubes 10, 11, and 12 to be shifted in a first direction defined as being from left to right in Fig. 1. Switching tube 50 is provided to cause information stored in tubes 10, 11, and 12 to be shifted in a second direction defined as being from right to left in Fig. 1. The structure associated with the two switching tubes 36 and 50 are the same and the operation of the two tubes are alike except that they switch information in opposite directions in the tubes 10, 11, and 12.

Referring now to switching tube 36 and its associated circuitry, the "0" target electrode 42 is not connected to any of the gating networks 13, 14, or 15, nor to any of the beam position tubes 10, 11, or 12. In this preferred embodiment the "0" target electrode 42 is utilized as a neutral position wherein no transfer of information is effected. The target electrode 43 which represents the "1" position is connected to the gating network 15 and the latter will be opened when the electron beam of switching tube 36 impinges on "1" position target electrode 43.

Consecutive target electrodes 44, 45, and 46 of switching tube 36 control the cathodes 35, 34, and 23 of tubes 12, 11, and 10 respectively, through the triodes 51, 52, and 53 respectively. The target electrodes 44 and 45 of tube 36 are also connected directly to the gating networks 14 and 13 respectively. As the electron beam which originates from cathode 47 of tube 36 is caused to rotate from target electrode to target electrode in consecutive manner beginning with the "0" target electrode, the gating networks 15, 14, and 13 are caused to be opened and the tubes 12, 11, 10 are caused to be cleared and new information from the preceding tube stored therein, in the following order: Gating network 15, then simultaneously tube 12 and gating network 14, then simultaneously tube 11 and gating network 13, and then tube 10.

As a specific example, the simultaneous opening of gating network 14 and the cutting off of the electron beam of tube 12 will result in the information stored in tube 11 being transferred to tube 12 when the electron beam of switching tube 36 leaves the target electrode 44. This operation will be explained in more detail later.

The gating network 15 represents a load circuit for the output of tube 12. If desired the number of tubes in the register may be increased by adding another tube onto the gating network 15. The length of the register can be increased up to seven tubes in this manner with the particular switching means (tubes 36 and 50) used herein. As pointed out hereinafter the capacity of the register can be increased beyond seven by employing switching tubes with larger numbers of target electrodes.

It is to be noted that the circuitry necessary to cause the operation of all the spade electrodes in switching tubes 36 and 50 is not completely shown in Fig. 1 in order to avoid unnecessarily complicating the drawing. Representative of the type circuitry required to step the electron beam from target electrode to target electrode are resistors 61 and 62 which connect the spade electrodes 64 and 65 to the common battery source 63. The cathode 47 is connected to the battery source 67 through resistance 66.

The anode 60 of triode tube 68 which is connected to the cathode 47 of switching tube 36 is also connected to positive battery source 67 through the resistance 66. The remaining spade electrodes such as spade electrodes 37, 38, 39, 40, 41, 48, and 49 are also connected through resistors similar to resistors 61 and 62 to the battery 63 or a similar source of voltage, although such connections are not shown.

The triodes 51, 52, and 53 are utilized to invert the potential of the pulses from the target electrodes 44, 45, and 46 of tube 36. Negative pulses from the target electrodes 44, 45, and 46 of tube 36 are applied to the grid electrodes 69, 70, and 71 of triode tubes 51, 52, and 53 respectively through the capacitors 72, 73, and 74 respectively. This will cause the plate current in the triodes 51, 52, and 53 to decrease, thus causing the potential of the plate electrodes 75, 76, and 77 to increase. The increase of potential of the plates 75, 76, and 77 is impressed on the cathodes 35, 34, and 23 of tubes 12, 11, and 10 respectively to cause the electron beams in the tubes 12, 11, and 10 to be cut off substantially for the duration of the positive potential increase of the plates 75, 76, and 77.

The operation of the switching tube 36 is controlled by the triode 68 which is comprised of plate 60, grid 256 and cathode 257. The cathode 257 is connected to ground through variable resistance 720. A negative signal impressed upon the grid electrode 256 from pulse source 148 will cause the plate current of the tube 68 to decrease, thus increasing the potential of the plate 60 in a positive polarity. By causing the potential of the plate 60 to increase a proper amount for a certain interval of time, the electron beam of tube 36 will be caused to advance one spade electrode, as for example, from "0" position spade electrode 37 to "1" position spade electrode 38. Consequently, every time the grid 256 is pulsed ten times all of the information stored in the register will be advanced one stage since the switching tube 36 will have gone through a complete cycle.

The switching tube 50 and associated circuitry is the same as the switching tube 36 and associated circuitry except that, as stated hereinbefore, the information stored in the beam position tubes will be shifted in a reverse direction designated as being from right to left in Fig. 1. The electron beam of switching tube 50 rotates in a counterclockwise direction around the cathode as an axis as do the electron beams of tubes 10, 11, 12, and 36. Spade electrodes 80, 81, 82, 83, and 84 represent "0," "1," "2," "3," and "4" electron beam positions respectively. Target electrode 85 represents the "0" or neutral target position and is not connected to either a gating network or to any beam position of tubes 10, 11, and 12. Target electrode 86 is connected to gating network 89. Target electrode 87 is connected to gating network 90 and to the grid of triode 91 through capacitor 92. Target electrode 88 is connected to gating network 93 and to the grid of triode 94 through capacitor 95. Target electrode 890 is connected to the grid of triode 96 through capacitance 97. The plates of triodes 91, 94, and 96 are connected to cathodes 23, 34, and 35 of tubes 10, 11, and 12 respectively through conductors 98, 99, and 100 respectively. The cathodes of tubes 91, 94, and 96 are connected to ground through variable resistances 101, 102, and 103 respectively. The triode tube 104 which is used to advance the electron beam of switching tube 50 is comprised of grid 105, cathode 106 which is connected to ground potential through variable resistance 107, and the plate which is connected to cathode 310 of the switching tube 50. A pulse source 108 is adapted to impress pulses upon the grid 105 of triode 104 to perform the same function with respect to switching tube 50 as does the pulse source 148 and the triode 68 with respect to switching tube 36.

In one particular embodiment of the invention the tubes 10, 11, 12, 18, and 50 are of the type described in the application for Letters Patent Serial No. 407,296, now U.S. Patent No. 2,848,646, mentioned hereinbefore. The triodes 51, 52, 53, 91, 94, 96, 68, 104, and 116 may be of a type 5687 manufactured by the Tung-Sol Lamp Works, Inc., located in Newark, New Jersey. Capacitors 72, 73, 74, 92, 95, and 97 each have a value of .01 microfarad. Variable resistors 109, 110, 111, 101, 102, 103, 720, and 107 each have a range of from 0 ohms to 10,000 ohms but ordinarily operate around 3,000 ohms. Resistances 66 and 112 each have a value of 30,000 ohms. Resistances for the spade electrodes of switching tubes 36 and 50, such as 61 and 62, each have a value of 100,000 ohms and resistance 405 has a value of 30,000 ohms. Battery sources 67 and 113 each have a value of 250 volts and battery source 63 also has a value of 250 volts. Battery source 401 has a value of 150 volts. The input pulse sources 114, 132, and 133 which are connected to the cathode 23, 34, and 35 of tubes 10, 11, and 12 respectively transmit pulses having a duration of approximately .7 microsecond and an amplitude of approximately 150 volts. Input pulse sources 148 and 108 each transmit pulses having a duration of about .7 microsecond and an amplitude of about 15 volts.

A zeroizing circuit for beam position tube 12 which is indicated within the dotted outline 127 comprises triode tube 116, plate load resistance 117, capacitance 118, battery source 119 and zeroizing pulse source 120. The triode 116 is comprised of grid 121, cathode 122, and plate 123. The zeroizing pulse source 120 is connected to both the cathode 35 of tube 12 and to the grid 121 of tube 116. Battery source 119 and plate load resistance 117 are connected in series arrangement across the plate 123 and the cathode 122 of tube 116. The capacitor 118 is also connected across the plate 123 and the cathode 122 of tube 116.

It is to be noted that each of the beam position tubes 10 and 11 also have a zeroizing means such as is shown at 127 in Fig. 1 and described herein with respect to beam position tube 12. However, the means to zeroize the beam position tubes 10 and 11 are shown in the drawing only in block diagram form inasmuch as the circuitry contained therein is the same as the circuitry of the zeroizing means contained within the dotted line 127 relating to tube 12 and further since the drawing is more easily understood if they are drawn in block diagram form.

More specifically the blocks 124 and 125 correspond to the structure within the dotted line block 127. The leads 129 and 128 of blocks 124 and 125 respectively correspond to lead 350 emanating from the dotted block 127 and are connected respectively to the "0" position spade electrodes 19 and 26 of tubes 10 and 11 respectively. The leads 1270 and 130 of blocks 124 and 125 respectively correspond to lead 131 emanating from dotted block 127 and are connected to the cathodes 23 and 34 of tubes 10 and 11 respectively. The operation of the zeroizing circuits will be discussed in detail later.

Similarly, the block diagrams 252 and 253 are shown for the zeroizing circuits of switching tubes 36 and 50 respectively. Zeroizing circuit 252 has leads connected to the cathode 47 and the "0" position spade electrode 37 of tube 36 and zeroizing circuit 253 has leads connected to the cathode and "0" position spade electrode 80 of tube 50. The operation of these zeroizing circuits is the same as for the zeroizing circuits of tubes 10, 11, and 12.

Blocks 132 and 133 connected respectively to the cathodes of tubes 11 and 12 represent pulse sources adapted to generate negative pulses of a proper amplitude and width to cause the tubes 11 and 12 to count independently.

Figure 4:
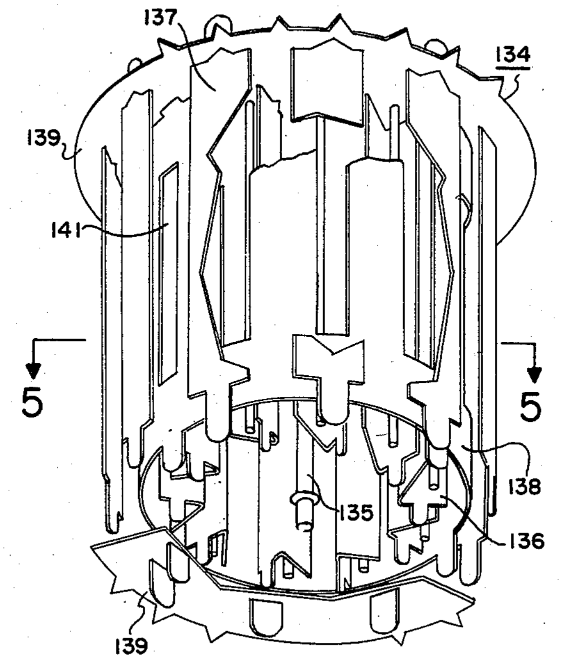
Fig. 4 is a perspective view, partly broken away in section, of a type of beam position tube which may be utilized in the invention.
Figure 5:
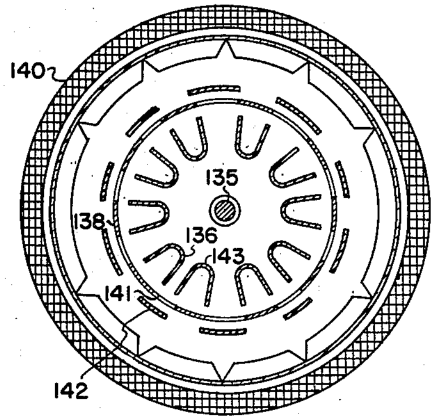
Fig. 5 is a cross-sectional view of the tube shown in Fig. 4 and taken along line 5—5 thereof.

Referring to Figs. 4 and 5 there are shown detailed drawings of a type beam position tube which is used in one preferred embodiment of the invention. The tube 134 is a ten position switching type tube having, within a hermetically sealed envelope (shown in Fig. 5), an elongated thermionic cathode 135; an inner coaxial array of elongated beam locking elements or spade electrodes, such as spade electrode 136, positioned parallel with and concentrically about the cathode 135; an outer coaxial array of elongated target electrodes, such as target electrode 137, positioned parallel with and concentrically around said cathode 135 and in line with the spaces between the spade electrodes, and a sleeve-shaped anode 138 positioned between the two arrays of spade and target electrodes. The spade electrodes preferably have a substantially U shaped transverse cross section, the rounded apex of the U facing the cathode. Anode 138 is preferably in the form of a cylindrical ring positioned between the spade electrodes and the target electrodes and provided with rectangularly shaped slots 141 which are in line with the spaces between the spade electrodes and permit the electron beam to pass therethrough and impinge upon the target electrodes which are positioned behind the slots. The electrodes are maintained in their spaced relationship within the envelope by top and bottom mica spacers 139. A magnetic field whose lines of force extend generally parallel to the cathode 135 (perpendicular to the plane of the drawing in Fig. 5) is provided either as a part of the tube or external thereto. This magnetic field referred to above may be provided by the external magnet 140 shown in Fig. 5. Leads to the various elements or electrodes are connected to pins in the tube base or stem (not shown). Reference is made to the patent application Serial No. 405,613, filed January 22, 1954 by Saul Kuchinsky, now U.S. Patent No. 2,848,605 for a more complete discussion of this type of tube.

Reference is also made to United States Patents Nos. 2,513,260 and 2,591,997 issued respectively to H. Alfven et al. and N. Backmark for general background as to the operation of this type of tube.

The general operation of this type tube is well known in the art, such as is cited above, and will be described only briefly herein. Normally, the potential of the spade electrodes is at a higher potential than the cathode potential. The potential of the anode 138 is also at a higher potential than the cathode. Each of the spade electrodes has an individual resistor connected thereto which is not shown in Figs. 4 or 5, but which are included in the gating networks of Figs. 2 and 3 as will be explained later. Each time a negative pulse is applied to a spade electrode such as spade electrode 136 to cause the spade electrode to assume a potential somewhat below the cathode potential, then, since the anode 138 is positive with respect to the cathode, an equipotential line will be formed extending from the cathode 135 to a point between the anode 138 and the spade 136. The electron beam will then flow from the cathode along this equipotential line and impinge upon the spade electrode 136. Once the electron beam impinges upon the spade electrode it will lock therethrough a resistance (not shown) connected to the spade electrode. Thus, the negative pulse can be removed and the electron beam will remain locked on the spade electrode 136. The electron beam tends to rotate in one direction or the other around the cathode depending upon the direction of the flux lines of the magnet 140. In this instance if the electron beam tends to rotate in a counterclockwise direction, only a small portion of the beam will continue to impinge upon the spade electrode 136 while the remainder of the electron beam will pass through the adjacent slot 141 and impinge upon the target electrode 142 in line therewith. Thus, if the electron beam is in a "cut-off" condition and a negative pulse is applied to the spade electrode 136, and subsequently the electron beam is turned on again during the time the negative pulse is applied to the spade electrode 136, the electron beam will lock upon this spade electrode 136. Consequently, upon initial operation of the tube the electron beam can be caused to flow to any desired spade electrode. It is this type operation that is utilized in the circuit of Fig. 1 to transfer information from one tube to another.

The electron beam in the tube can be caused to step consecutively from a given spade electrode 136 to the next adjacent spade electrode 143 of Fig. 5 by applying a positive pulse of the proper amplitude to the cathode 135. This positive pulse must be of a discrete width so that the electron beam will have time to rotate only to the said next adjacent spade electrode 143. This mode of operation can be used when it is desired to independently enter information into any of the tubes 10, 11, and 12.

Figures 6, 7, 8:
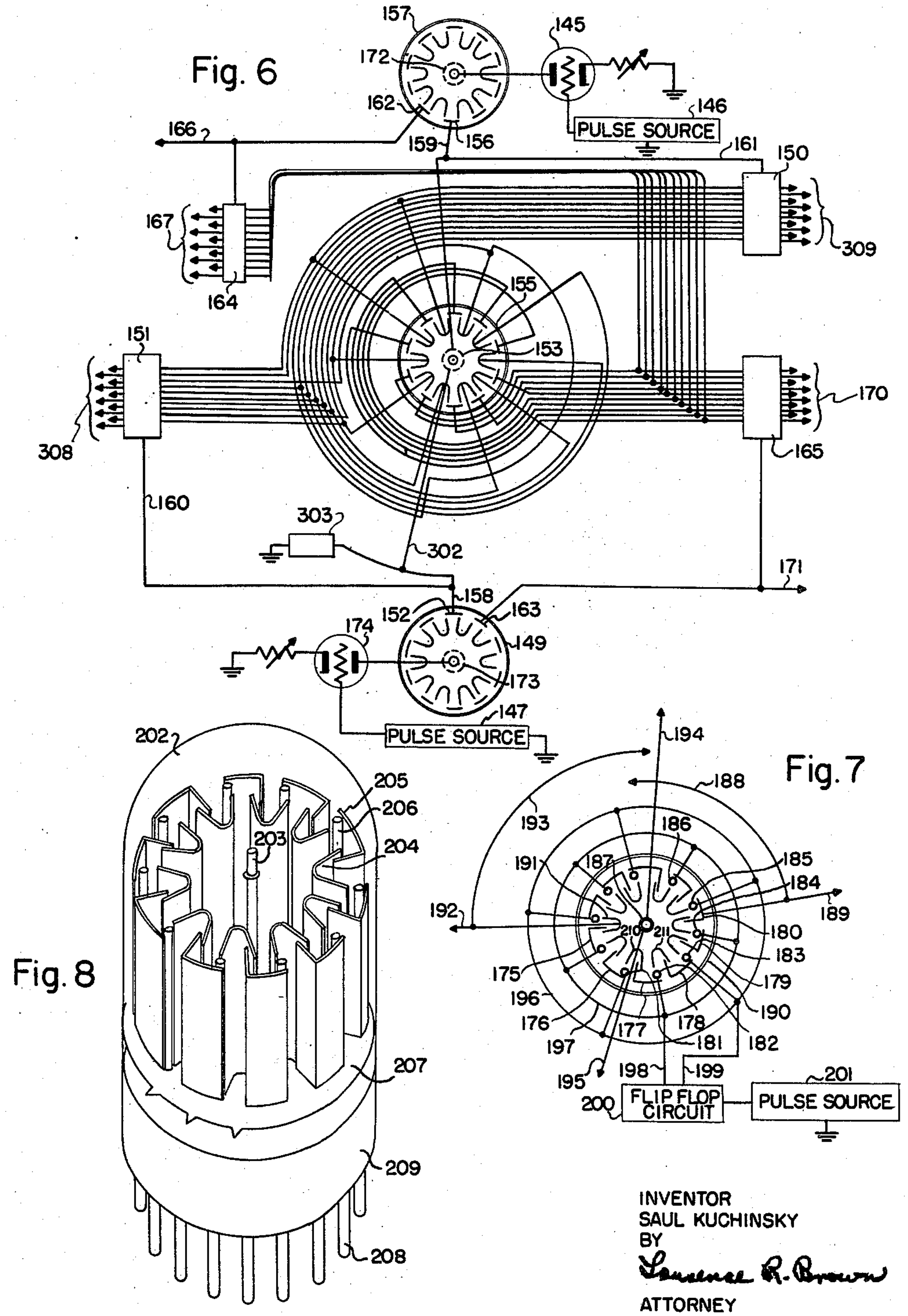
Fig. 6 is a schematic sketch of another embodiment of the invention.
Fig. 7 is a schematic sketch of a third embodiment of the invention.
Fig. 8 is a perspective view of the structure of the beam position tube used in the embodiment of Fig. 7.

Referring now to Fig. 6 there is shown an alternative circuit means for shifting information from one beam position tube to the next adjacent beam position tube. It is to be noted that only one beam position tube 155 is shown in Fig. 6, whereas in Fig. 1, three beam position tubes are shown. Much of the circuitry of Fig. 6 corresponds to the circuitry of Fig. 1. For example, triodes 145 and 174 of Fig. 6 correspond to triodes, such as triodes 68 and 104 of Fig. 1, pulse sources 146 and 147 of Fig. 6 correspond to pulse sources, such as pulse sources 108 and 148 of Fig. 1. The gating circuits 151, 150, 164, and 165 of Fig. 6 correspond to the gating circuits of Fig. 1.

In general the major differences between the circuit of Fig. 1 and the circuit of Fig. 6 is that the tube 155 of Fig. 6 provides a grid 153 immediately surrounding the cathode which is directly connected to the target electrodes, such as target electrode 152 of commutator tube 149 of Fig. 6, thereby eliminating the triode tubes, such as 51, 52, 53, 91, 94 and 96 of Fig. 1. The grid 153 is not utilized in the circuit shown in Fig. 1. Functionally the grid 153 is a substitute for the triodes 51, 52, 53, 91, 94, and 96 of Fig. 1 in that potential reversing characteristics of the triodes is not needed when the grid 153 is used. The target electrodes 152 and 156 of switching tubes 149 and 157 respectively are connected directly to the grid 153 of beam position tube 155 through conductors 158 and 159 respectively. Further, the target electrode 152 of switching tube 149 is connected to the gating network 151 through conductor 160 in order to substantially simultaneously cause the electron beam of tube 155 to be cut off and the gating network 151 to be opened. Similarly, the target electrode 156 of commutator tube 157 is connected to the gating network 150 through the conductor 161 so that when the electron beam of tube 157 impinges on target electrode 156 the electron beam of tube 155 will be cut off and the gating network 150 will be opened.

Target electrodes 162 and 163 of commutator tubes 157 and 149 are connected to gating networks 164 and 165 respectively which are associated with adjacent stages of the register in a manner similar to the circuitry of Fig. 1. Conductors 166 and 171 connect target electrodes 162 and 163 of tubes 157 and 149 to the grids of the adjacent tubes (not shown) corresponding to grid 153 of tube 155. These connections represent portions of the circuitry for transferring information contained in the adjacent stages (not shown). Conductor groups 167 and 170 of gating networks 164 and 165 go to the spade electrodes of the beam position tubes adjacent either side of tube 155. Conductor groups 308 and 309 of the gating networks 151 and 150 go to the corresponding target electrodes of the adjacent beam position tubes.

It is to be noted that grids may also be utilized in the switching tubes 157 and 149. More specifically grid 172 is provided in switching tube 157 and grid 173 is provided in switching tube 149. The plate outputs of triodes 145 and 174 are connected respectively to the grids 172 and 173 of switching tubes 157 and 149 respectively.

Other methods of stepping the electron beam consecutively from spade electrode to spade electrode can be utilized with modifications of the tube. For example, in the above mentioned Patent No. 2,721,955 there is disclosed a tube type having what is therein defined as switching control grid electrodes, such as grid electrodes 181 through 186. A schematic sketch and a perspective view of this type tube is shown in Figs. 7 and 8 respectively. The grid electrodes are connected in a push-pull arrangement such that the potential on a first set of alternate grid electrodes is lowered to cause the electron beam to advance one spade electrode. Then the potential on the other set of alternate grid electrodes is caused to be lowered which in turn will cause the electron beam to advance to the next spade electrode.

Figure 2:
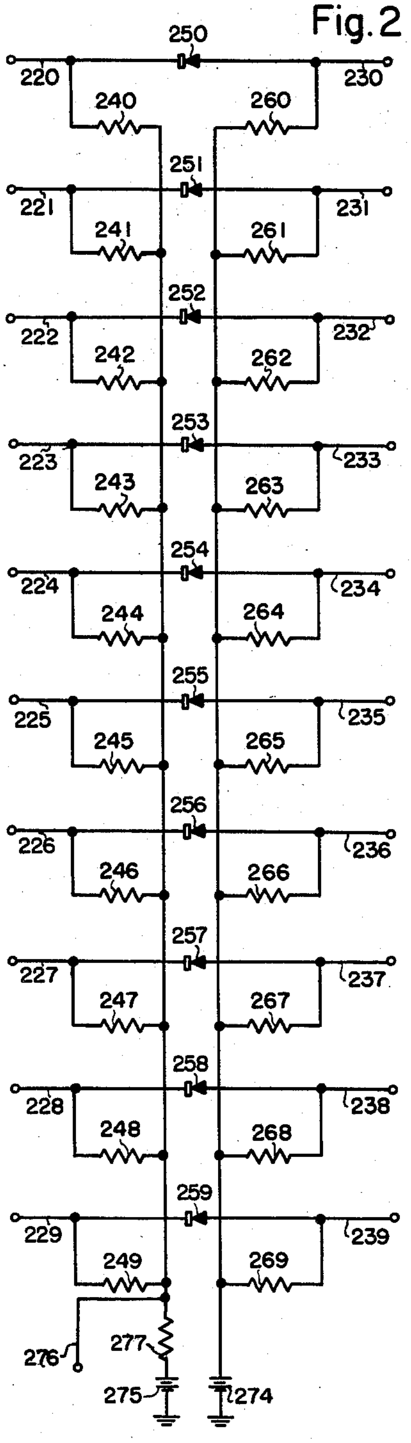
Fig. 2 is a schematic sketch of one type gating network which can be used in the circuit of Fig. 1.
Figure 3:
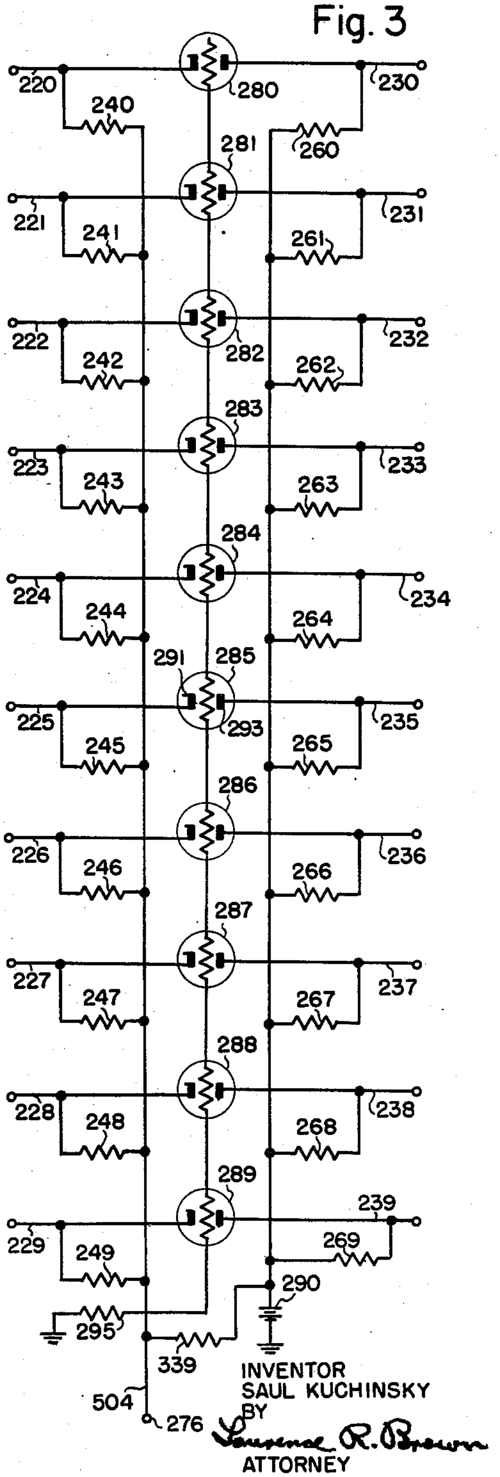
Fig. 3 is a schematic sketch of an alternative gating network which can be used in the circuit of Fig. 1.

This type tube may be used in the invention shown in Fig. 1 as a substitute for beam position tubes 10, 11, and 12. The connections shown are similar to those of the beam position tubes 10, 11, and 12 of Fig. 1 with some exceptions noted hereinafter. More specifically the target electrodes such as target electrodes 175 through 180 are each representative of a particular digit and are each connected to the spade electrodes representing corresponding digits of an adjacent beam position tube through gating networks to enable shifting of stored information to the adjacent beam position tubes. As a specific example the target electrode 180 is shown as having a lead 189 therefrom which is connected through a gating network to a spade electrode of the next following beam position tube and another lead 188 from target electrode 180 through a gating network to a corresponding spade electrode of the next preceding beam position tube. The remaining target electrodes are each representative of a particular digit and are each connected through a gating network to the target electrodes, representing corresponding digits, of the next adjacent beam position tubes to enable shifting of stored information to the adjacent beam position tubes. Similarly, each spade electrode of tube 190 is connected to the corresponding target electrodes of adjacent tubes through gating networks. As a specific example the spade electrode 191 is shown as having a lead 192 connected thereto which extends to a gating network and then to the target electrode of the next preceding beam position tube and also has a lead 193 connected through a gating network to the corresponding target electrode of the next following target electrode. It is to be noted that the gating networks referred to are of the same type as is shown in Figs. 2 and 3 and are utilized in the same manner as the gating networks shown in Fig. 1. Conductor 194 connects the cathode 187 to a target electrode of a switching tube (not shown) which performs the function of the switching tube 50 of Fig. 1, and conductor 195 connects the cathode 187 to a switching tube (not shown) which performs the function of the switching tube 36 of Fig. 1.

Alternate grid electrodes, such as grid electrodes 181, 183, and 185, are connected to a common conductor 196. The other set of alternate grid electrodes, such as grid electrodes 182, 184, and 186, are connected to the common conductor 197. Common conductors 196 and 197 are connected respectively to conductors 198 and 199 which constitute the two output terminals of binary device 200 which in turn is actuated by pulses transmitted from pulse source 201.

Referring now to Fig. 8 there is shown a perspective view of the type tube used in Fig. 7. The cathode 203 is positioned within a hermetically sealed envelope 202. Arranged concentrically around the cathode 203 are a group of ten U shaped spade electrodes such as spade electrode 204. A group of ten L shaped target electrodes such as target electrode 205 are arranged concentrically around said spade electrodes in such a manner that one leg of the L of each target electrode is positioned across the gap between the adjacent pair of spade electrodes and the other leg of the L extends into the U of one of the spade electrodes. Positioned between each of the target electrodes and the remaining spade electrode of the pair is a switching control grid electrode such as grid electrode 206. The cathode, the spade electrodes, the target electrodes, and the control grid electrodes are all positioned by means of one or more mica spacers 207. Pins such as pin 208 are secured in base 209 and are separately connected to the cathode, the spade electrodes, the target electrodes, and the beam control electrodes.

Referring now to Fig. 2 there is shown a gating network used in the invention. This gating network is one of several possible ones which can be used in the circuit of Fig. 1 and which is represented generally by the blocks 13, 14, 15, 89, 90, and 93 of Fig. 1. Fig. 2 typifies the gating circuits represented by the blocks 89, 90, and 93 of Fig. 1. The leads 220–229 of the gating circuit are connected to the outputs of the target electrodes of any one of the tubes 10, 11, and 12, and the leads 230–239 of the gating circuit are connected to the inputs of the corresponding spade electrodes of the next adjacent beam position tube. It is to be noted as stated hereinbefore that each of the gating networks connect together spade electrodes and target electrodes representing the same digit. For example, in Fig. 1, conductor 270 which is connected to the zero ("0") position target electrode 27 of tube 11 is connected through the gating network 14 to the conductor 271 which in turn is connected to the zero ("0") position spade electrode 28 of tube 12. Conductor 270 of Fig. 1 is therefore connected to lead 229 of Fig. 2 and conductor 271 of Fig. 1 is connected to lead 239 of Fig. 2. Each of the ten leads 220 through 229 is similarly connected to corresponding ones of the conductors identified as a group by designation 272 and each of the other of the ten leads 230 through 239 is connected to corresponding ones of the conductors identified as a group by designation 273.

Assuming that Fig. 2 represents the gating circuit 14 of Fig. 1, it is evident that the component of the gating circuit which connects the output 270 of the target 27 to the input 271 of spade 28 comprises the resistors 249 and 269, asymmetrical device 259, battery sources 275 and 274, and resistor 277. It is to be noted that the battery sources 275 and 274 and the resistor 277 are common to all of the ten individual gating circuit components shown in Fig. 2.

The battery source 275 supplies the potential for all of the target electrodes of a given beam position tube 10, 11 or 12, and the resistors 240 through 249 form individual loads for the various target electrodes of this tube as well as forming a part of the gating network. The battery source 274 supplies the potential for the spade electrodes of an adjacent beam position tube and the resistors 260 through 269 comprise load resistors for the spade electrodes of this last tube as well as forming a part of the gating network. The potential of battery source 274 is higher than the potential of the cathodes of tubes 10, 11, and 12 of Fig. 1 and the potentials of battery source 275 is higher than that of battery source 274. Thus, the potential of the target electrodes is higher than the potential of the spade electrodes which in turn are higher than the potential of the cathode, in the absence of an electron beam.

Each gating circuit component operates in a similar manner. Assume that the electron beam of tube 11 of Fig. 1 is impinging upon the "0" position target electrode 27. The electron beam current may then be traced from the cathode 34 of tube 11 in Fig. 1 to the "0" position target electrode 27, conductor 278, conductor 270, then (in Fig. 2), lead 229, resistance 249, resistance 277, and battery source 275 to ground. This electron current flow through the resistances 249 and 277 decreases the potential of lead 229. The polarity of the asymmetrical device 259 is such that the potential of lead 239 tends also to be decreased to the same potential as lead 229. Any decrease of potential on lead 239 which is connected to the "0" position spade electrode 28 of tube 12 is not sufficiently negative to cause the electron beam of tube 12 to impinge upon the "0" position spade electrode 28 of tube 12 when the electron beam of tube 12 is turned on from an "off" condition. If, however, a negative pulse is applied to conductor 276 of Fig. 2 from target electrode 44 of the switching tube 36 of Fig. 1, then the potential of all the leads 220 through 229 will be decreased a certain amount. The circuit for this signal can be traced from the switching tube 36, through conductor 276, resistance 277, to the battery source 275. The decrease in potential on leads 220 through 228 which are each connected through a diode to a spade electrode of tube 12 will be insufficient by itself to cause the electron beam of tube 12 to impinge upon any of the spade electrodes connected to any of the leads 230 through 238. The potential drop appearing on lead 239 due to a negative pulse applied on lead 276, however, is in addition to the decrease in potential due to the electron beam of tube 11 impinging on its "0" position spade electrode. Consequently the "0" position spade electrode 28 of tube 12 is at a more negative potential than any of the other spade electrodes of tube 12. This more negative potential is somewhat less than the cathode 35 potential. Since the target electrodes are at a more positive potential than the cathode potential, a beam is formed between the cathode and a point between the "0" position spade electrode and its associated target electrode.

As was discussed hereinbefore, the electron beam of tube 12 is cut off at the same time the gating network 14 is opened. However, due to the inherent capacity in the circuit including the capacitance between spade electrode 28 and the other electrodes adjacent thereto, the negative potential will remain on the spade electrode 28 after the electron beam of tube 12 is turned on, thus causing said electron beam to impinge upon the spade electrode 28.

Thus, it can be seen that in order to transfer information from a given tube to an adjacent tube it is necessary to have a negative voltage applied to the lead 276 of the gating network of Fig. 2 from the switching tube 36 and also to have a negative pulse from the target electrode upon which the electron beam of said given tube is impinging impressed upon the associated lead of leads 220 through 229 of the gating network of Fig. 2.

The diode 259 of Fig. 2 performs the function of permitting lead 239 to be at a more negative potential than lead 229 but does not permit lead 229 to be at a more negative potential than lead 239. Thus, when the potential of lead 229 decreases, the potential of lead 239 will also decrease if the potential of lead 229 decreases below the original potential of lead 239.

In one preferred embodiment the gating network of Fig. 2 can have the following circuit element values: Resistances 240 through 249 have a value of about 3000 ohms. Resistances 260 through 269 have a value of about 100,000 ohms. Resistance 277 has a value of about 3000 ohms. Battery sources 275 and 274 have values of 230 volts and 200 volts respectively. Asymmetrical devices 250 through 259 may be of the selenium type although other types may be used.

The gating network of Fig. 3 performs the same function as does the gating network of Fig. 2 with different structure. The leads 220 through 229 of Fig. 3 correspond to the leads 220 through 229 of Fig. 2 and the leads 230 through 239 of Fig. 3 correspond to leads 230 through 239 of Fig. 2. Resistors 240 through 249 of Fig. 3 correspond to resistors 240 through 249 of Fig. 2 and resistors 260 through 269 of Fig. 3 correspond to resistors 260 through 269 of Fig. 2. The battery source 290 is connected to the anodes of the triodes 280 to 289 through resistances 260 to 269 such as, for example, to anode 293 of triode 285 through resistance 265 and is connected to the cathodes of triodes 280 to 289 through resistance 339 and resistors 240 to 249 such as, for example, to cathode 291 of triode 285 through resistance 245. The grids of the tubes 280 to 289 are connected to ground potential through the resistance 295. Normally the tubes 280 through 289 are non-conductive and the cathodes and anodes thereof are at the potential of battery source 290.

In the operation of the gating network of Fig. 3, a negative pulse is impressed upon one of the leads 220 through 229 and a negative pulse must be impressed upon the lead 276, which corresponds to lead 276 of Fig. 2, to cause information to be transferred from a given tube 10, 11, or 12 of Fig. 1 to an adjacent tube. Assume, for example, that it is desired to transfer an information bit of "5" stored in tube 11 of Fig. 1 to tube 12. Block diagram gating circuit 14 of Fig. 1 will then be the gating network under discussion. The electron beam of tube 11 of Fig. 1 will be impinging upon its target electrode 25 which will decrease the potential of the cathode 291 of tube 285 of Fig. 3 below that of the cathodes of the other of the tubes 280 through 289 in a circuit which may be traced from the target electrode 25 of tube 11 of Fig. 1 through conductor 297, conductor 298, lead 225 of Fig. 3, resistor 245, resistor 339 to battery source 290.

The potential of lead 225 of Fig. 3 is thus decreased. This will cause a plate current flow through tube 285 of Fig. 3 to lower the potential of the anode 293 of the tube. Consequently, the anode 293 will be at a lower potential than any of the anodes of the other tubes 280 through 289. The anode 293 is connected to the spade electrode 29 of tube 12 of Fig. 1 by a circuit extending from anode 293, lead 235 of Fig. 3, conductor 299 of Fig. 1 to spade electrode 29 of tube 12. This potential on the spade electrode 29 is not by itself, however, sufficiently negative to cause the electron beam of tube 12 to impinge thereon. When a negative pulse from the switching tube 36 is impressed upon the conductor 276 of Fig. 1 and also of Fig. 3, the cathode 291 potential of tube 285 of Fig. 3 will be decreased so that the current through the tube 285 will be further increased, thus decreasing the potential of the anode 293 of tube 285 still further. It is to be noted that the potential of the anodes of all of the tubes 280 through 289 are decreased by the application of the negative pulse on the lead 276. However, the anode 293 of tube 285 is the only one of the anodes of tubes 280 through 289 at a potential sufficiently low to cause the electron beam of tube 12 of Fig. 1 to impinge upon the connected spade electrode 29 when the said electron beam is turned "on" from an "off" condition.

The following values of circuit elements may be used in a preferred embodiment of the invention. Resistors 240 through 249 may have a valve of 4000 ohms. Resistors 260 through 269 may have a value of 6000 ohms. Resistors 295 and 339 may have values of 1,000,000 ohms and 8000 ohms respectively. Battery source 290 may have a value of 200 volts. Triode tubes 280 through 289 are of type identified as 5687 manufactured by the Tung-Sol Lamp Works, Inc., located in Newark, N. J. Other type tubes having suitable characteristics may also be used. Other values of resistors and battery sources may be used in accordance wtih various engineering designs in the gating networks of both Fig. 2 and Fig. 3.

The operation of the circuit shown in Fig. 1 will now be described in detail. Assume that the electron beams in all of the tubes 10, 11, 12, 36 and 50 are impinging upon their zero spade electrodes by means of their associated zeroizing circuitry 124, 125, 127, 252, and 253 respectively. Assume that it is desired to enter the digit "6" into the tube 10. Six negative pulses of a proper amplitude and a discrete width are thereupon transmitted from the input pulse source 114 through the conductor 115 to the cathode 23 of beam position tube 10. This will cause the electron beam to step right to left consecutively from the "0" position spade electrode 19 to the "6" position spade electrode 17 and target electrode 20.

If now it is desired to transfer the information stored in the tube 10 to the tube 11 the electron beam of the switching or commutator tube 36 must be caused to step around its target electrodes. This can be accomplished by applying a train of positive pulses to the control grid 256 of tube 68 from pulse source 148. The plate 60 of tube 68 will thus have a corresponding series of negative pulses produced thereon which will be impressed upon the cathode 47 of commutator tube 36. The electron beam of tube 36 will be caused to advance from the zero position target electrode 42 consecutively around the remaining target electrodes in a counterclockwise direction (right to left in Fig. 1). As the electron beam impinges upon spade electrode 38 and target electrode 43, the gating network 15 will be opened and the potential on the "0" position target electrode 33 of tube 12 caused by the electron beam of tube 12 impinging thereon will be impressed through the gating network 15 upon the load resistance contained in the gating network 15 or through to the next tube stage (not shown) if it is desired to extend the register. Next the electron beam of tube 36 will impinge upon the spade electrode 39 and the target electrode 44 and impress a negative voltage upon the grid 69 of triode tube 51 to increase the potential of plate 75. The negative pulse from the target electrode 44 is also impressed upon the gating network 14 to open the same. The positive pulse created on the plate 75 of tube 51 will be impressed upon the cathode 35 of tube 12 to cut off the electron beam thereof.

When the gating network 14 is caused to be opened by the negative pulse from the target electrode 44 of tube 36 the target electrodes of tube 11 are thereby connected to the corresponding spade electrodes of tube 12 in such a manner as to lower the potential of the particular spade electrode of tube 12 corresponding to the target electrode of tube 11, upon which is impinging the electron beam of tube 11, sufficiently to cause the electron beam of tube 12, when turned on, to impinge upon the said particular spade electrode of tube 12. Thus, when the electron beam of tube 36 leaves target electrode 44 and the electron beam of tube 12 is turned on thereby, (i.e. accelerated to impinge upon a spade electrode), it will be caused to impinge upon the "0" position spade electrode 28. This is due to the resistance and inherent capacity of the circuitry associated with each spade electrode of tubes 10, 11, and 12 which causes a potential to remain on the spade electrode after the source has been removed.

The electron beam in the tube 36 next advances to the spade electrode 40 and target electrode 45 which is connected to the grid 70 of triode tube 52 and also to the gating network 13 which is opened thereby. The plate current of tube 52 will thereupon be decreased so that the potential of the plate 76 will be increased. The plate 76 is connected to the cathode 34 of beam position tube 11 and the potential of cathode 34 of tube 11 will therefore be increased sufficiently so that the electron beam thereof will be cut off. The gating network 13 is opened at the same time the electron beam of tube 11 is cut off. Consequently, any energized target electrode of beam position tube 10 is adapted to energize the corresponding spade electrode of beam position tube 11. Since the electron beam of tube 10 is impinging upon its "6" position target electrode 20 which is connected to the "6" position spade electrode 300 of tube 11, the electron beam of tube 11 will be caused to impinge upon its "6" position spade electrode 300 after being turned on which occurs when the electron beam of tube 36 leaves its target electrode 45. The electron beam of tube 36 will then rotate to impinge upon target electrode 46 to cause the grid 71 of triode 53 to become negative, thus causing the plate 77 of triode 53 to become more positive which will cut off the electron beam of beam position tube 10 to clear the tube. The electron beam of tube 36 then continues to rotate over the remaining target electrodes in accordance with the number of pulses impressed upon the grid 256 of tube 68.

The remaining target electrodes of tube 36 are not connected to the cathodes of any beam position tubes so that there is no advance of information in the row of beam position tubes as a result thereof. However, since the "9" position target electrode 301 of tube 36 is connected to the "0" position spade electrode 19 of tube 10 the electron beam of tube 10 will be caused to impinge upon its "0" position spade electrode.

As a result of the above operation the electron beam of the tube 12 is impinging on its "0" position spade electrode, the electron beam of the tube 11 is impinging on its "6" position spade and the electron beam of tube 10 is impinging on its "0" position spade electrode.

Assume now that a "4" is entered into the beam position tube 10 by application of four negative input pulses from input pulse source 114 on the cathode 23 of beam position tube 10. If now a train of pulses is applied to the grid 256 of tube 68 the switching tube 36 will cause the information in tube 12 to be transferred to the load circuit contained in gating network 15. The information contained in tube 11 will be transferred to the tube 12 when the gating network 14 is opened and after tube 12 has been cleared, and the information stored in tube 10 will be transferred to the tube 11 when the gating network 13 is opened and after tube 11 has been cleared. After the information is transferred out of the tube 10, the electron beam of tube 10 is returned to its "0" position spade electrode so that the tube 10 will be prepared for the next train of input pulses from input pulse source 114.

Assume now that a train of 8 positive pulses are applied to the cathode 23 of tube 10 from source 114 to cause the electron beam of tube 10 to step to spade electrode 18 and target electrode 21.

If now a train of pulses is applied to the grid 256 of the triode 68 the electron beam in the switching tube 36 will be caused to rotate. The number "4" stored in tube 12 will be transferred to the load represented by gating network 15. The number "6" stored in the tube 11 will be transferred into the tube 12, and the number "8" stored in the tube 10 will be transferred into the tube 11. When the electron beam of switching tube 36 leaves its target electrode 301 the electron beam of tube 10 will be caused to return to its "0" spade electrode 19.

It is to be noted that more than three beam position tubes can be utilized in the register. For example, with the switching tube 36, in which there are 10 spades and thus 10 different electron beam positions, there can be seven beam position tubes. One of the spade or target positions is used to open the last gating network (such as gating network 15). The "9" position spade electrode is used to zeroize the first tube in the row (such as tube 10) and the "0" spade electrode is a neutral position. A switching tube having more electron beam positions will have a correspondingly larger capacity.

Assume now that it is desired to shift the information stored in tubes 10, 11, and 12 in the opposite direction, i.e., from right to left. A train of positive pulses of the proper amplitude and duration are applied to the grid 105 of triode 104 from pulse source 108. This will cause a series of negative pulses to appear on the plate of triode 104. These negative pulses will be impressed upon the cathode 310 of switching tube 50 to cause the electron beam of tube 50 to rotate in a counterclockwise direction. When the electron beam of tube 50 impinges on its "1" position target electrode 86 the gating circuit 89 will be opened to cause the information stored in the tube 10 to be impressed on the load contained in gating circuit 89. In this case the electron beam of tube 10 is impinging on its "0" position target electrode which represents the information stored therein. The electron beam of switching tube 50 next impinges on its "2" position target electrode 87 which is connected to the grid of tube triode 91 and to the gating network 90. The plate of tube 90 is caused to become positive thereby and since this plate is connected to the cathode 23 of tube 10 the electron beam of the tube 10 will be cut off. Simultaneously the gating network 90 is opened to permit the information stored in tube 11 to be transferred to tube 10. Since the electron beam of tube 11 is impinging on its "8" position target electrode 311 which is connected to the "8" position spade electrode 18 of tube 10 the electron beam of tube 10 will be caused to impinge upon its "8" position spade electrode 18 when the electron beam of switching tube 50 leaves its target electrode 87, thus effectively transferring the information stored in tube 11 to tube 10.

When the electron beam of switching tube 50 impinges on its target electrode 88 a negative pulse is transmitted therefrom to the grid of triod 94 and to the gating network 93 to cut off the electron beam of tube 11 and to open the gating network 93 thus causing the potential of "6" position target electrode 312 upon which the electron beam of tube 12 is impinging to be impressed upon the "6" position spade electrode 300 of tube 11. When the electron beam of tube 50 leaves its target electrode 88 the electron beam of tube 11 will be turned on and will impinge upon its "6" position spade electrode 300.

The electron beam of tube 12 will be turned off when the electron beam of switching tube 50 impinges on its target electrode 89 to transmit a negative pulse to the grid of triode 96, the anode of which is connected to the cathode 35 of tube 12. When the beam of tube 50 impinges on its "9" position target electrode 313 the electron beam of tube 12 will be caused to impinge on its "0" position spade electrode 28 which is connected to the said target electrode 313 by conductor 314.

Referring now to Fig. 6 the operation of the circuitry shown therein will be described. In general the operation of the circuitry external of the beam position tubes is similar to that of Fig. 1 so the following description of operation will be limited to the differences between Fig. 6 and Fig. 1.

The grid 153 of tube 155 is adapted to cut off the electron beam thereof when a negative pulse from either commutator tube 157 or commutator tube 149 is applied thereto. Thus, the same function is accomplished as when a positive pulse from the plate of one of the triode tubes such as triode 52 (Fig. 1) impresses a positive pulse upon the cathode of a beam position tube such as beam position tube 11 (Fig. 1). When the negative pulse is removed from the grid 153 (Fig. 6) the electron beam will be turned on and will impinge upon the spade electrode upon which a negative potential has been impressed through a gating network from the adjacent beam position tube, (not shown).

If it is desired to cause the electron beam of tube 155 to step to a certain position a series of negative pulses of the proper duration and amplitude can be impressed upon conductor 302 and thence upon grid 153 from pulse source 303. The conductor 302 corresponds, for example, to conductor 400 of Fig. 1, and pulse source 303 corresponds, for example, to pulse source 132 of Fig. 1 except that pulse source 303 generates a negative pulse whereas pulse source 132 generates a positive pulse.

In the operation of the tube shown in Fig. 7 the electron beam is caused to advance from spade electrode to spade electrode in a counter-clockwise direction by means of the grid electrodes such as grid electrodes 181 through 186. Assume the electron beam is locked upon spade electrode 210. Under these conditions the conductor 199 is at a potential somewhat less than the cathode 187 potential. Alternate ones of the grid electrodes such as grid electrodes 181, 183, and 185 connected to the common conductor 196 are therefore also at a potential somewhat less than cathode 187. The other group of alternate grid electrodes such as grid electrodes 182, 184, and 186 are connected to the common conductor 197 which in turn is connected to lead 198 having a higher potential than the cathode 187 potential. Consequently, the electron beam will remain impinged on the spade electrode 210 since it sees a higher than cathode potential in the counterclockwise direction in which it tends to rotate. It is to be noted that the conductor 198 and the conductor 199 are connected to separate output terminals of the binary or flip-flop device 200.

If it is desired to advance the electron beam from spade electrode 210 to spade electrode 211 a pulse is transmitted from pulse source 201 to the binary device 200. This will cause the high potential to shift from conductor 198 to conductor 199 and the low potential from conductor 199 to conductor 198. Inasmuch as the conductor 198 is connected to common conductor 197 the grid electrode 182 will present a potential to the electron beam that is somewhat lower than cathode potential. Thus, a cathode equipotential line will be established between the grid 182 and the spade electrode 211. The electron beam will thereupon be caused to rotate to this equipotential line and a portion of the electron beam will thereupon impinge upon the spade electrode 211 causing the potential of the spade electrode 211 to decrease to cathode potential due to the electron beam current flow through the spade resistor which is not shown in Fig. 5 but is shown in the gating circuits of Figs. 2 and 3 as has been more fully described hereinbefore. The electron beam will continue to rotate over the spade electrode until it reaches a position where a portion of the electron beam is impinging on spade electrode 211 and a portion is impinging on the target electrode 178. Under these conditions a sufficient portion of the electron beam will be flowing through the spade electrode 211 to maintain an equipotential line from the cathode 187 to the spade electrode 211.

A subsequent pulse transmitted from the pulse source 201 to the binary device 200 will again reverse the potential of the terminals 199 and 198 and cause the electron beam to step to the next spade electrode.

Zeroizing of the beam position tubes may be accomplished in several different ways, one of which is shown in Fig. 1. Generally speaking, the electron beam should first be cut off, then turned on again after the potential of the zero ("0") position spade electrode has been reduced so that a substantially equipotential line will exist between the cathode and the "0" spade electrode at the time the electron beam is turned on. Pulse source 120 can be caused to transmit a positive pulse at a particular time. This positive pulse will simultaneously be impressed upon the cathode 35 of beam position tube 12 and also upon the grid 121 of triode 116. The pulse impressed upon the cathode 35 is of a sufficient amplitude to cause the electron beam of tube 12 to be cut off. The pulse impressed by the grid 121 of tube 116 will cause the plate current of the tube 116 to increase, thus decreasing the potential of the plate 123. The plate 123 of tube 116 is connected to the "0" position spade electrode 28 of tube 12 so that the negative potential of plate 123 will be impressed on the spade electrode 28. The capacitor 118 will assume the potential of the plate 123 and when the pulse from source 120 is removed from the grid 121 the capacitance 118 will remain charged for an interval of time thereafter. The negative potential charge on the capacitor 118 will be impressed on the "0" spade electrode 28 after the electron beam of tube 12 has been turned on which occurs as soon as the pulse from source 120 is removed. Consequently, the electron beam of tube 12, when it is turned on, is caused to impinge upon the "0" position spade electrode 28. A similar operation may be performed by the zeroizing circuits 124 and 125 for tubes 10 and 11 respectively.

It is to be noted that the forms of the invention herein shown and described are but preferred embodiments of the same and that various changes may be made in circuit constants, circuit arrangements, and type tubes used without departing from the spirit or scope of the invention.

What is claimed is:

1. A shift register comprising a plurality of stages arranged in an electrical row where the nth stage is the last stage in said row, the first stage in said electrical row of stages comprising a first multiple position electron beam tube, each of the remaining stages in said row of n stages comprising a second multiple position electron beam tube and a gating network, each of said multiple position electron beam tubes comprising a cathode means adapted to generate an electron beam and a plurality of anode means, each of said anode means adapted to intercept said electron beam in one of its multiple positions, means coupled with the gating network of any given stage for connecting each of said plurality of anode means of said given multiple position electron beam tube to the corresponding one of the plurality of anode means of the multiple position electron beam tube of the immediately preceding stage, and switching means for causing the electron beam position of each stage to be shifted to the next following adjacent stage, said switching means comprising a plurality of outputs individually connected one each to each of said plurality of stages, each of said plurality of outputs having such structure that when energized they substantially simultaneously de-energize the multiple position electron beam tube of the associated stage and open the gating network of the associated stage to cause the potential of the particular anode means of the multiple position electron beam tube of the preceding stage to be impressed upon the corresponding anode of the multiple position electron beam tube of said given stage, said switching means having further structure to cause its outputs to be energized in the order in which they are connected to the said plurality of stages beginning with the nth stage in said row of stages and proceeding consecutively through said stages to the first stage in said row of stages.

2. A shift register including, in combination, a plurality of electron discharge devices, a plurality of gating networks each individually electrically positioned between adjacent ones of said electron discharge devices so that individual ones of the electron discharge devices and individual ones of the gating networks are alternately arranged in a series order, and switching means, each of said electron discharge devices comprising a cathode means from which an electron beam is generated and a plurality of anode means each representative of a particular digit and upon which the electron beam is capable of impinging, means to cause said electron beam to impinge upon selectable one of said anode means, each of said gating networks having associated circuits electrically connected between adjacent ones of said electron discharge devices so that each anode means of one of the electron discharge devices is individually associated with a corresponding one of the anode means of an adjacent one of said electron discharge devices, said switching means having a plurality of output circuits connected for energization in a predetermined order, each of the said output circuits of the switching means being individually associated both with a given one of said electron discharge devices and the immediately preceding gating network therefor and having coupling circuits for substantially simultaneously disabling the electron discharge device with which it is associated during the time the output is energized and to open the gating network preceding the electron discharge device during the time the output is energized, the outputs of the switching means including circuits connected to the electron discharge devices in such a manner that the predetermined order in which they are energized will cause the electron discharge devices to become disabled in the order in which they appear in the series arrangement.

3. A shift register in accordance with claim 2 comprising a second switching means, said second switching means having a plurality of second outputs having circuits for energizing each individual one of said second outputs in a predetermined order, each of said second outputs being individually associated both with a given one of said electron discharge devices and the immediately following gating network and having means for substantially simultaneously disabling the electron discharge device with which it is associated and for opening the associated immediately following gating network during the time the output is energized, the said second outputs of the second switching means including further means connected to the electron discharge devices in such a manner that the electron discharge devices will become disabled in an order reversed to that caused by the first switching means.

4. A shift register in accordance with claim 2 in which each of said cathode means has an elongated shape, in which each of said anode means comprises an elongated spade electrode and an elongated target electrode, said spade electrodes being spaced apart and arranged concentrically around the said cathode means, said target electrodes being spaced apart and arranged concentrically around the said spade electrodes, each of said target electrodes being positioned so as to intercept a line from said cathode means through the spacing between adjacent spade electrodes, first potential means adapted to maintain said spade electrodes at a higher potential than the potential of said cathode in the absence of an electron beam impinging thereon, and second potential means adapted to maintain said target electrodes at a potential higher than the potential of said cathode in the absence of an electron beam impinging thereon.

5. A shift register in accordance with claim 2 in which each of said electron discharge devices includes a grid electrode arranged concentrically around the cathode means thereof, and in which each of said plurality of anode beams comprises a target electrode and a spade electrode, said spade electrodes being arranged concentrically around said cathode means with adjacent spade electrodes being spaced a distance apart from each other, said target electrodes being arranged concentrically around said spade electrodes in such a manner that each of said target electrodes is positioned so as to intercept a line from said cathode through the spacing between adjacent spade electrodes, potential means adapted to maintain the potential of said spade electrodes higher than the potential of said cathode in the absence of an electron beam impinging thereon, second potential means adapted to maintain the potential of said target electrodes at a potential greater than the potential of said spade electrodes, and means to create a magnetic field perpendicular to all the positions of the electron beam so that said electron beam will flow in a substantially equipotential path, the pulses from the outputs of the said swtiching means being adapted to be impressed on the grid electrodes of the electron discharge devices to cut off the electron beam from the anode means.

6. A shift register in accordance with claim 2 comprising a plurality of pulse source means individually associated with one each of said electron discharge devices and adapted to cause the electron beam of the associated electron discharge device to step from anode means to anode means in a consecutive order, each of said pulse source means comprising an output lead connected to the cathode means of the associated electron discharge device and adapted to transmit pulses thereto which will change the electric field between said cathode means and said anode means such that the electron beam cannot flow therebetween.

7. A shift register in accordance with claim 2 comprising a plurality of zeroising means associated one each with said electron discharge devices, each of said zerozing means comprising energizable means connected to the cathode means of the associated electron beam and adapted to cause said electron beam to be cut off from said anode means, and said energizable means further being associated with a particular one of said anode means and adapted to energize said particular anode means so that when said electron beam is returned to its "on" condition it will impinge upon said particular anode means.

8. A shift register in accordance with claim 2 in which each said plurality of anode means comprises a target electrode, a spade electrode, and a control grid electrode, first potential means adapted to maintain said spade electrode at a higher potential than said cathode means in the absence of the electron beam impinging thereon, second potential means adapted to maintain the potential of said target electrodes at a higher potential than the potential of said spade electrodes, third potential means adapted to impress a potential lower than the cathode potential upon said grid control electrodes, said spade electrode being spaced apart and being arranged concentrically around said cathode, said target electrodes being arranged concentrically around said spade electrodes and individually positioned with respect to said spade electrodes to intercept a line extending from said cathode means through the space between adjacent spade electrodes, said control grid electrodes being arranged concentrically around said cathode means between said target electrodes and said spade electrodes and inividually positioned with respect to adjacent spade and target electrodes in such a manner that the electric field created by potentials impressed on said control grid electrodes by said third potential means will influence the path of the electron beam of the electron discharge device, and means to create a magnetic field having the flux lines thereof extending substantially parallel to the axis around which the spade and target electrodes are concentrically arranged.

9. A shift register in accordance with claim 2 in which each of said anode means comprises a target electrode, a spade electrode, and a control grid electrode, potential means adapted to maintain said spade electrodes at a higher potential than said cathode means in the absence of the electron beam impinging thereon, second potential means adapted to maintain the potential of said target electrodes at a higher potential than the potential of said spade electrodes, third potential means adapted to impress a potential lower than the cathode potential upon said control grid electrodes, said spade electrodes being spaced from the cathode and spaced apart from one another, said target electrodes being spaced apart and individually positioned with respect to said cathode means to intercept a line extending from said cathode through the space between adjacent spade electrodes, said control grid electrodes being arranged between said target electrodes and said spade electrodes and individually positioned one each between an individual spade electrode and associated target electrode in such a manner that the electric field created by potentials impressed on said control grid electrodes by said third potential means will influence the path of the electron beam of the electron discharge device.

10. A shift register in accordance with claim 9 wherein the pulses from the outputs of the said switching means are arranged to be impressed on the grid electrodes of the electron discharge devices to cause the electron beams therein to be cut off.

11. An electronic device comprising a plurality of electron discharge devices, a plurality of gating networks, and a first commutating means, said plurality of electron discharge devices and said plurality of gating networks being arranged in alternate series order, each of said plurality of electron discharge devices comprising a cathode to generate an electron beam and a plurality of anode means, a plurality of first means one each individually associated with each of said electron discharge devices for accelerating said electron beam toward said anode means, each of said gating networks including circuits coupling together corresponding anode means of adjacent electron discharge devices, said first commutating means including means for disabling said first means associated with each of said plurality of first discharge means in reverse order of said series order and for individually opening each gating network substantially simultaneously with the disabling of the first means associated with the immediately next succeeding electron discharge device, means in each of said gating networks for causing the potential of the anode means upon which the electron beam of the immediately preceding electron discharge device is impinging to condition the corresponding anode means of the immediately following electron discharge device whose first means has been disabled when the gating networks are opened so that when the electron beam of the said immediately following electron discharge device is turned on again it will impinge upon the said energized anode means.

12. An electronic device in accordance with claim 11 comprising a plurality of zeroizing means one each individual to each of said plurality of electron discharge devices, each of said zeroizing means comprising a pulse source, a first output means, and a second output means, said first output means including structure connected to the cathode of the associated electron discharge device for disabling the electron beam from impinging upon a particular anode means, said second output means having circuits connected to a particular one of the said anode means of the associated electron discharge device for applying a potential upon said particular anode means of such a value that when the electron beam is enabled it will impinge upon the said particular anode means.

13. An electronic device in accordance with claim 11 comprising a plurality of pulse sources, one each of said pulse sources being individual to one of said plurality of electron discharge devices, each of said pulse sources comprising an output lead connected to the first means of the associated electron discharge device and including structure for impressing electrical pulses of a particular amplitude and duration upon the first means of the associated electron discharge device to cause the electron beam of the associated electron discharge device to step consecutively from one anode means to the adjacent anode means with each pulse.

14. An electronic device in accordance with claim 11 comprising a second commutating means, said second commutating means including structure for disabling said first means associated with each of said plurality of first discharge means in the order of said series arrangement and for individually opening each gating network substantially simultaneously with the disabling of the first means associated with the immediately preceding electron discharge device, each of said gating networks including means for causing an indication of the position of the electron beam of the electron discharge device simultaneously disabled to impinge upon the anode means corresponding to the anode means upon which impinges the electron beam of the next succeeding electron discharge device in said series order when said gating networks are opened.

15. A shift register comprising a plurality of counting means, a plurality of gating networks, and a commutating means, individual ones of said plurality of counting means and said plurality of gating networks being arranged alternately in series order, each of said counting means comprising a plurality of individually selectable separate output positions each representative of a specific bit of information, a plurality of means, one each of said plurality of means individually associated with each of said counting means for energizing any selected one of the said output positions of the associated counting means, said commutating means including structure for momentarily and individually disabling each of said plurality of means thus de-energizing the energized output positions of each of said plurality of counting means and for opening each of said plurality of gating networks in a time sequence in accordance with the reverse order in which said plurality of counting means and said plurality of gating networks appear in said series order, each of said gating networks including means operable when the networks are opened to enable the energizing of the output position of the disabled counting means corresponding to the energized output position of the immediately preceding counting means in said series order.

16. A shift register in accordance with claim 15 in which each of said counting means includes a cathode means adapted to generate an electron beam, said electron beam being adapted to selectively energize one of said separate output positions, grid control means arranged between said cathode means and said output positions, said grid control means being adapted to cut off said electron beam from said output positions, each of said gating networks being adapted to electrically associate corresponding output positions of adjacent counting means, means to create a magnetic field substantially perpendicular to the flow of the electron beam from the cathode to any of the output positions so that the electron beam will follow an equipotential path in its flow from the cathode to any of the said output positions, the potential of the output position upon which the electron beam of any of the counting means is impinging being of a value to cause a substantially equipotential line between the corresponding output position and the cathode of the next succeeding counting means when the intervening gating network is opened.

17. A shift register in accordance with claim 16 comprising a plurality of zeroizing means individually associated one each with each of said plurality of counting means, each of said plurality of zeroizing means comprising a pulse source, a first output means and a second output means adapted to be energized by a pulse from said pulse source, said first output means being connected to the cathode means of the associated counting means and adapted when energized by a pulse originating from the associated pulse source to cut off the electron beam, said second output means being connected to a particular one of said plurality of output means and adapted when energized by a pulse originating from the associated pulse source to apply a potential on the said particular output means of a value as to cause the electron beam of the associated electron beam to impinge thereon when said electron beam is caused to return to its "on" condition.

18. A shift register in accordance with claim 16 comprising a plurality of pulse sources each individually connected to one of the cathodes of said counting means and adapted to transmit a pulse of a particular amplitude and duration to the cathode of the associated counting means to cause the electron beam thereof to step consecutively from output means to output means.

19. An electronic shift register comprising a plurality of first electron discharge devices, a plurality of gating networks, and a commutating means adapted to transmit pulses, each of said electron discharge devices comprising a first elongated cathode means adapted to generate an electron beam, a plurality of first elongated target electrodes spaced apart and at a distance from said first elongated cathode means, and a plurality of second elongated electrodes individually associated one each with individual ones of said target electrodes for directing an electron beam from said cathode to selectable ones of said target electrodes, said plurality of electron discharge devices and said plurality of gating networks being arranged alternately in an electrical row, the target electrodes of each of said electron discharge devices individually representing particular digits, the said second electrodes of each of said electron discharge devices connected to individually represent the same particular digits as the target electrodes with which they are associated, first means for causing the electron beam of each of said electron discharge devices to follow an equipotential line from said first elongated cathode means to one of said plurality of second electrodes, said first means comprising means to create a magnetic field substantially parallel to said elongated cathode means, and means to apply a difference of potential between said first elongated cathode means and said plurality of second electrodes, said commutating means including structure for transmitting pulses to each of said plurality of first electron discharge devices and to said plurality of gating networks to momentarily cut off each of the electron beams of each of said plurality of said electron discharge devices and for simultaneously opening the gating network preceding each of said electron discharge devices in the order in which said gating networks and said electron discharge devices appear in said electrical row beginning at the end of the row.

20. An electronic shift register in accordance with claim 19 in which each of said plurality of first electron discharge devices comprises a grid electrode positioned between said first elongated cathode means and the group of electrodes consisting of said plurality of first elongated target electrodes and said plurality of second elongated electrodes, each of said grid electrodes being connected to said commutating means and adapted when energized by a pulse transmitted from said commutating means to cut off the electron beam of the associated one of said first electron discharge devices.

21. An electronic shift register in accordance with claim 19 comprising a second commutator means, said second commutator means including circuits for transmitting pulses to each of said plurality of first electron discharge devices and to said plurality of gating networks to momentarily cut off each of the electron beams of said electron discharge devices in a consecutive manner and to substantially simultaneously open the gating network following each of said electron discharge devices by transmitting pulses to said electron discharge devices and said gating networks in the order in which said electron discharge devices appear in said electrical row beginning at the beginning of the row.

22. An electronic shift register in accordance with claim 19 in which said commutating means comprises a second electron discharge device, said second discharge device comprising a second elongated cathode, a plurality of second elongated target electrodes, a plurality of third elongated electrodes individually associated one each with each of said second target electrodes in the same manner as each of said second electrodes are associated with individual ones of said first target electrodes, means to create a magnetic field substantially parallel to the said second elongated cathode, and third means connected to cause an electron beam emanating from said second elongated cathode means to step from second elongated target electrode to second elongated target electrode in a consecutive order, a circuit individually associating one each of said plurality of second elongated target electrodes with each of the said first plurality of electron discharge devices and the immediately preceding gating networksi n such order that pulses will be transmitted to said first electron discharge devices in the reverse order in which the electron discharge devices appear in the row.

23. An electronic shift register in accordance with claim 19, comprising a plurality of signal pulse input means individually connected to the cathodes of each of the said plurality of first electron discharge devices to individually cause the electron beams therein to advance from target electrode to target electrode in accordance with the number of signal pulses transmitted thereto from said plurality of signal pulse input means.

24. An electronic shift register in accordance with claim 19 in which the said plurality of second elongated electrodes of each of said first plurality of electron discharge devices are spaced apart and arranged concentrically around the associated elongated cathode means and in which the said plurality of first elongated target electrodes of each of said first plurality of electron discharge devices are spaced apart and arranged concentrically around the associated elongated cathode and outside of said plurality of second elongated electrodes with respect to said first elongated cathode means thereby presenting a substantially continuous alternate array of elongated target electrodes and elongated second electrodes to said first elongated cathode means.

25. An electronic shift register in accordance with claim 19 in which said gating networks include a plurality of electron discharge devices, each of which includes a cathode, plate, and control grid, the cathode being connected to a target electrode of the preceding one of said first-mentioned electron discharge devices and the plate being connected to one of said second elongated electrodes of the succeeding one of said first-mentioned electron discharge devices.

References Cited in the file of this patent

UNITED STATES PATENTS

| | | |
|---|---|---|
| 2,396,211 | Skellett | Mar. 5, 1946 |
| 2,473,159 | Lyman | June 14, 1949 |
| 2,480,130 | Grieg | Aug. 30, 1949 |
| 2,533,401 | Schramm | Dec. 12, 1950 |
| 2,580,771 | Harper | Jan. 1, 1952 |
| 2,591,997 | Backmark | Apr. 8, 1952 |
| 2,620,454 | Skellett | Dec. 2, 1952 |
| 2,658,142 | St. John | Nov. 3, 1953 |
| 2,735,005 | Steele | Feb. 14, 1956 |